US012759630B2

(12) United States Patent
Chang et al.

(10) Patent No.: US 12,759,630 B2
(45) Date of Patent: Oct. 13, 2026

(54) INDEPENDENT CORNER MODULE

(71) Applicants: Hyundai Motor Company, Seoul (KR); Kia Corporation, Seoul (KR)

(72) Inventors: Sehyun Chang, Suwon-Si (KR); Sang Woo Hwang, Seoul (KR); Min Jun Kim, Busan (KR); Young Il Sohn, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 837 days.

(21) Appl. No.: 17/970,119

(22) Filed: Oct. 20, 2022

(65) Prior Publication Data

US 2023/0150575 A1 May 18, 2023

(30) Foreign Application Priority Data

Nov. 18, 2021 (KR) ........................ 10-2021-0159171

(51) Int. Cl.

*B62D 7/18* (2006.01)
*B60G 11/00* (2006.01)
*B62D 3/02* (2006.01)
*B62D 5/04* (2006.01)

(52) U.S. Cl.

CPC ................ *B62D 7/18* (2013.01); *B60G 11/00* (2013.01); *B62D 3/02* (2013.01); *B62D 5/0418* (2013.01)

(58) Field of Classification Search

CPC ...... B60G 3/01; B60G 11/00; B60G 2200/44; B60G 2202/40; B60G 2204/4192; B62D 3/02; B62D 3/12; B62D 5/04; B62D 5/0403; B62D 5/0418; B62D 7/06; B62D 7/14; B62D 7/16; B62D 7/18; B62D 7/20; Y02E 10/50

USPC .......................................................... 180/444

See application file for complete search history.

(56) References Cited

U.S. PATENT DOCUMENTS

| | | | | |
|---|---|---|---|---|
| 1,840,407 | A | 1/1932 | Norman | |
| 6,408,230 | B2 | 6/2002 | Wada | |
| 8,590,664 | B2 | 11/2013 | Terashima et al. | |
| 8,684,115 | B2 * | 4/2014 | Bryant .................. | B62K 21/00 180/6.5 |
| 9,085,302 | B2 | 7/2015 | Borroni-Bird et al. | |
| 10,759,416 | B1 | 9/2020 | Funke et al. | |
| 10,780,917 | B2 | 9/2020 | Schaedler et al. | |
| 10,967,695 | B2 | 4/2021 | Swank, II | |

(Continued)

FOREIGN PATENT DOCUMENTS

| | | | |
|---|---|---|---|
| CN | 102774269 | A | 11/2012 |
| CN | 108516013 | A | 9/2018 |

(Continued)

*Primary Examiner* — Kevin Hurley
*Assistant Examiner* — Felicia L. Brittman-Alabi
(74) *Attorney, Agent, or Firm* — MORGAN, LEWIS & BOCKIUS LLP

(57) ABSTRACT

An independent corner module includes a knuckle fastened to a wheel, an axle gear link fastened to guide a vertical motion of the knuckle, a fixed frame adjacent to the axle gear link and fixed to a vehicle body, and a steering operator positioned between the axle gear link and the fixed frame to apply an operating force. Here, the steering operator rotates along the fixed frame upon application of operating force from the steering operator, and at a same time, the axle gear link rotates relative to the steering operator.

11 Claims, 4 Drawing Sheets

(56) References Cited

U.S. PATENT DOCUMENTS

| | | | |
|---|---|---|---|
| 2005/0280236 | A1 | 12/2005 | Vallejos |
| 2020/0189656 | A1 | 6/2020 | Hiroe et al. |

FOREIGN PATENT DOCUMENTS

| | | | | |
|---|---|---|---|---|
| DE | 102014004231 | A1 | 10/2015 | |
| DE | 102016207111 | A1 | 11/2017 | |
| DE | 102018118615 | A1 * | 2/2020 | ........... B62D 5/0418 |
| DE | 102018213156 | A1 | 2/2020 | |
| JP | 2006052803 | A | 2/2006 | |
| JP | 2007-022159 | A | 2/2007 | |
| JP | 2007-118766 | A | 5/2007 | |
| JP | 2017-124822 | A | 7/2017 | |
| JP | 2020053692 | A | 4/2020 | |
| KR | 2007-0103191 | A | 10/2007 | |
| KR | 20090069952 | A | 7/2009 | |
| KR | 10-1539027 | B | 7/2015 | |
| WO | WO 2007-006776 | A | 1/2007 | |
| WO | WO 2007-141439 | A | 12/2007 | |
| WO | WO2020234882 | A1 | 11/2020 | |

* cited by examiner

INDEPENDENT CORNER MODULE

CROSS-REFERENCE TO RELATED APPLICATION

The present application claims priority to Korean Patent Application No. 10-2021-0159171, filed on Nov. 18, 2021, the entire contents of which is incorporated herein for all purposes by this reference.

BACKGROUND OF THE PRESENT DISCLOSURE

Field of the Present Disclosure

The present disclosure relates to an independent corner module. More, it relates to an independent corner module configured to impart a wide steering angle to a wheel by independently rotating a steering operator and an axle gear link upon application of operating force from the steering operator, which is located between a fixed frame and the axle gear link.

Description of Related Art

The conventional suspension for a vehicle connects a vehicle axle and a vehicle body so that vibration or shock received by the vehicle axle from a road surface is not directly transmitted to the vehicle body while the vehicle is traveling, preventing damage to the vehicle body or cargo and improving riding comfort. Such a suspension includes a suspension spring configured to alleviate shocks received from the road surface, a shock absorber configured to improve riding comfort by suppressing free vibration of the suspension spring, and a stabilizer configured to suppress rolling of the vehicle.

As a suspension for a commercial vehicle, an integral axle suspension in which left and right wheels are connected by one axle is mainly used, and as a suspension spring, a leaf spring or an air spring is mainly used.

Meanwhile, a steering system of a commercial vehicle employing an integral axle suspension includes a pitman arm mounted on an output shaft of a steering gear to rotate therewith, a drag link configured to transmit the motion of the pitman arm, a knuckle arm configured to manipulate a knuckle spindle by receiving the motion of the drag link, a tie rod that connects left and right knuckle arms, and the like.

FIG. 1 illustrates a suspension system in which one end portion of a shock absorber is fixed to a vehicle body frame.

In a vehicle provided with the integral axle suspension and the steering system employing the air spring described above, the air spring serves merely to replace the leaf spring, and does not significantly contribute to improving riding comfort or handling characteristics. Furthermore, it is difficult to secure design freedom in implementing precise geometry due to the structural characteristics of the air spring.

Recently, an independent steering suspension configured to input a steering angle of a wheel through a motor assembly to individual suspensions is being developed. However, in the case of the independent steering suspension described above, there was a problem in that the rotation force applied from the steering motor could not be stably transmitted to the knuckle and the wheel.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an independent corner module facilitating independent rotation of a steering operator and an axle gear.

Furthermore, the present disclosure aims to provide an independent corner module configured so that a steering operator is rotated upon application of operating force from the steering operator, and at a same time, an axle gear link is rotated relative to the steering operator.

The objects of the present disclosure are not limited to the above-mentioned objects, and other objects of the present disclosure not mentioned herein may be understood based on the following description, and may be understood more clearly through the exemplary embodiments of the present disclosure. Furthermore, the objects of the present disclosure may be realized by means and combinations thereof indicated in the claims.

The independent corner module that achieves the above-described objects of the present disclosure includes the following configuration.

Various aspects of the present disclosure are directed to providing an independent corner module including a knuckle fastened to a wheel, an axle gear link fastened to guide the vertical motion of the knuckle, a fixed frame adjacent to the axle gear link and fixed to a vehicle body, and a steering operator positioned between the axle gear link and the fixed frame to apply an operating force. Here, the steering operator may be moved along the fixed frame by the operating force of the steering operator itself, and at a same time, the axle gear link may rotate relative to the steering operator.

In an exemplary embodiment of the present disclosure, the steering operator may include a carrier link surrounding at least portion of the axle gear link and at least portion of the fixed frame to move along the fixed frame, a motor configured to apply a rotation force, and a steering gear extending from a rotation shaft of the motor to be gear-engaged with the fixed frame and the axle gear link.

In another exemplary embodiment of the present disclosure, the axle gear link may include a link guide configured to guide the steering operator, and a gear formed on the link guide and engaged with the steering operator to enable the link guide to rotate when the steering operator rotates.

In yet another exemplary embodiment of the present disclosure, the fixed frame may include a frame gear provided at an end portion of the fixed frame that faces the steering operator.

In yet another exemplary embodiment of the present disclosure, the carrier link may include at least one first roller disposed on an internal side surface of the carrier link which is adjacent to the fixed frame or on an internal side surface of the carrier link which is adjacent to the axle gear link.

In still yet another exemplary embodiment of the present disclosure, the carrier link may further include at least one second roller disposed at a vertical end portion of the fixed frame adjacent to the carrier link or at a vertical end portion of the axle gear link adjacent to the carrier link.

In a further exemplary embodiment of the present disclosure, the steering operator may reach either one of opposite end portions of the fixed frame upon application of the operating force.

In another further exemplary embodiment of the present disclosure, when the steering operator is positioned at one of the opposite end portions of the fixed frame, the steering operator may be positioned at a corresponding one of opposite end portions of the axle gear link.

In yet another further exemplary embodiment of the present disclosure, the axle gear link may further include a vertical guide configured to allow one end portion of the knuckle to move vertically.

In yet another further exemplary embodiment of the present disclosure, the independent corner module may further include a buffer, wherein a first end portion of the buffer is coupled to the knuckle and a second end portion of the buffer is coupled to the axle gear link to support a vertical motion of the knuckle.

In still yet another further exemplary embodiment of the present disclosure, a surface of the axle gear link and a surface of the fixed frame that are adjacent to and face each other may have arc shapes sharing a same center.

Various aspects of the present disclosure are directed to providing an independent corner module including a knuckle fastened to a wheel, an axle gear link configured to guide the movement of the knuckle, a fixed frame fixed to a vehicle body, and a steering operator engaged to the axle gear link and the fixed frame and configured for applying an operating force of the steering operator to the axle gear link and to the fixed frame. Here, the steering operator and the axle gear link may be moved by the operating force of the steering operator.

In an exemplary embodiment of the present disclosure, when the operating force of the steering operator is applied, the axle gear link may rotate while the steering operator moves along the fixed frame.

In various aspects of the present disclosure are directed to providing an independent corner module including an axle gear link fastened to guide movement of a wheel, a fixed frame fixed to a vehicle body, and a steering operator configured for applying operating force to the axle gear link and to the fixed frame. Here, the steering operator and the axle gear link may be moved by the operating force from the steering operator.

In an exemplary embodiment of the present disclosure, when the operating force from the steering operator is applied, the axle gear link may be rotated while the steering operator moves along the fixed frame.

Other aspects and exemplary embodiments of the present disclosure are discussed infra.

It is to be understood that the term "vehicle" or "vehicular" or other similar term as used herein is inclusive of motor vehicles in general, such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
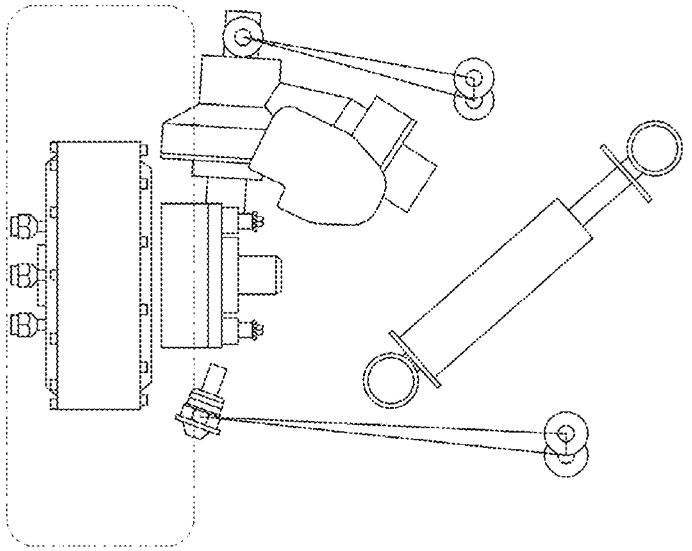
FIG. 1 illustrates a coupling relationship of a RevoKnuckle, as an example of the related art.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings. The exemplary embodiments of the present disclosure may be modified into various forms, and the scope of the present disclosure may not be construed as being limited to the following embodiments. The exemplary embodiments are provided to more completely explain an exemplary embodiment of the present disclosure to those skilled in the art.

Furthermore, terms such as "... knuckle", "... link", "... portion", "... frame", etc. used in the present specification each refer to a unit that processes at least one function or operation, and may be implemented as a hardware or a combination thereof.

Hereinafter, the exemplary embodiment of the present disclosure will be described in detail with reference to the accompanying drawings, and in the description provided with reference to the accompanying drawings, the same or corresponding components are provided the same reference numerals, and a description thereof will not be repeated.

Various embodiments of the present disclosure relates to an independent corner module. In the case of a multi-wheeled vehicle, the independent corner module may be individually coupled to a vehicle body, and the independent corner module may have a steering angular range of 90 degrees in left and right directions.

The independent corner module may be fixed to the vehicle body by welding or bolting, and may conduct electricity from a battery located in the vehicle body to allow power to be applied from the vehicle body to a steering operator 100. As described above, the independent corner module may be conductively connected to the vehicle while being fixed to the vehicle body according to a typical method.

Hereinafter, the independent corner module according to various exemplary embodiments of the present disclosure will be described with reference to a configuration including a wheel 500 located on the left side of the vehicle.

Figure 2:
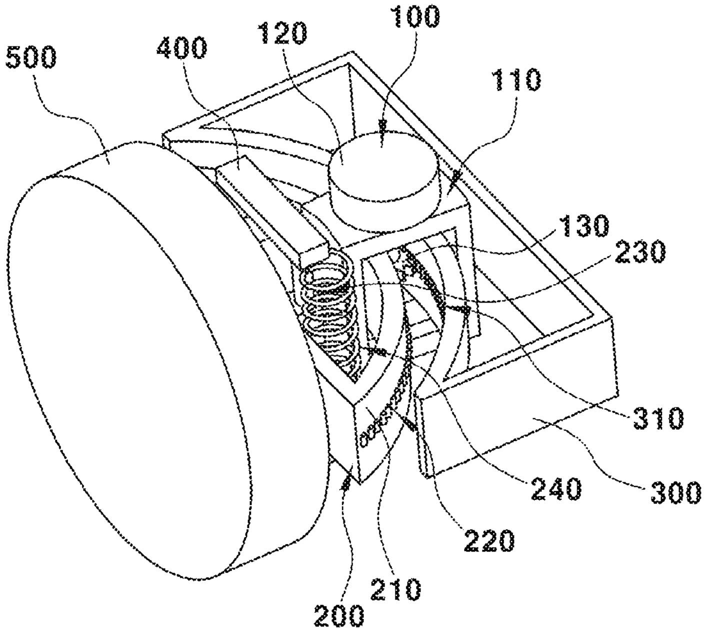
FIG. 2 illustrates a perspective view of an independent corner module as an exemplary embodiment of the present disclosure.
Figure 3:
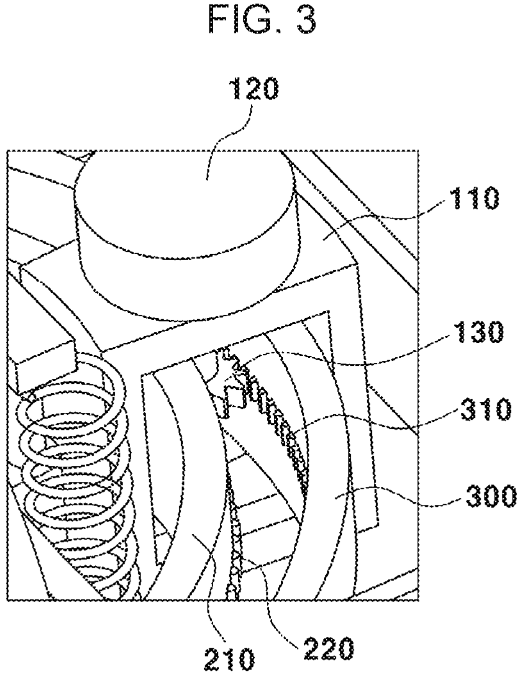
FIG. 3 is illustrates an coupling relationship of a steering operator of the independent corner module as an exemplary embodiment of the present disclosure.

FIG. 2 illustrates the independent corner module, and FIG. 3 illustrates a coupling relationship of a fixed frame 300 and an axle gear link 200 with the steering operator 100 centered therebetween.

As illustrated, the independent corner module includes the wheel 500, positioned to face the outside of the vehicle, and a knuckle 400, coupled with the wheel 500. The independent corner module includes the axle gear link 200, which is positioned inside the knuckle 400 and is coupled to one end portion of the knuckle 400. The independent corner module includes the fixed frame 300, which is coupled with the vehicle body, and the steering operator 100, which is positioned between the fixed frame 300 and the axle gear link 200 to apply an operating force. With the present configuration, when the operating force of the steering operator 100 is applied, the axle gear link 200 may be moved integrally with the wheel so that the rotation angle of the wheel is input.

The wheel 500 may be positioned at the outermost portion of the knuckle 400, and one end portion of the internal side of the knuckle 400 may be inserted into a vertical guide 230 of the axle gear link 200. Furthermore, the independent corner module includes a buffer 240, one end portion of which is coupled to the knuckle 400 and the other end portion of which is fixed to the axle gear link 200 to absorb a vertical motion applied from the wheel.

In various exemplary embodiments of the present disclosure, the buffer 240 may be implemented as a shock absorber or a coil spring. Accordingly, the knuckle 400 is configured to move along the vertical guide 230, which is located in the axle gear link 200, to guide the vertical motion applied from the wheel, and is configured to absorb a shock applied to the corner module from the wheel 500 through the configuration of the buffer 240 located between the knuckle 400 and the axle gear link 200.

Rotation force may be applied through the motor 120 located in the steering operator 100, and the steering operator 100 is configured to rotate with respect to the fixed frame 300 by the generated operating force. Furthermore, when the operating force from the steering operator 100 is applied, the axle gear link 200 is rotated relative to the steering operator 100.

The steering operator 100 surrounds at least portion of the axle gear link 200 and at least portion of the fixed frame 300, and includes a carrier link 110 configured to be movable along the fixed frame 300 when an operating force is applied. Furthermore, the steering operator 100 includes the motor 120 vertically penetrating the carrier link 110, and the rotation shaft of the motor 120 extends in a downward direction to be coupled to the axle gear link 200 and to the fixed frame 300, respectively. The motor 120 may be engaged with the axle gear link 200 and with the fixed frame 300 through a steering gear 130 located on the rotation shaft of the motor 120.

The steering gear 130 may be rotated corresponding to the amount of rotation of the motor 120, and the carrier link 110 is moved along the fixed frame 300 relative to the fixed frame 300 in proportion to the amount of rotation of the motor 120. The axle gear link 200, which is engaged with the steering gear 130, may rotate relative to the steering gear 130. The axle gear link 200 may rotate about the cross-sectional center portion of the wheel 500.

That is, when the rotation force of the motor 120 is applied, the steering operator 100 and the axle gear link 200 may rotate at the same time. Here, the rotation axis of the steering operator 100 may be aligned with the rotation axis of the axle gear link 200. Moreover, the distance that the steering operator 100 moves along the fixed frame 300 may be the same as the distance that the axle gear link 200 moves along the steering operator 100.

The axle gear link 200 may include a link guide 210, which is at least partially surrounded by the carrier link 110 to guide the steering operator 100, and may further include a gear 220, which is located on one surface of the link guide 210 to be engaged with the steering gear 130. The link guide 210 may have an arc shape with respect to the center portion of the wheel 500 when viewed in a cross section. The surface of the axle gear link 200 and the surface of the fixed frame 300 that are adjacent to and facing each other may have arc shapes sharing the same center. Accordingly, the steering operator 100, the axle gear link 200, and the fixed frame 300 may be mutually moved along the arc-shaped surfaces facing each other.

The gap between the fixed frame 300 and the link guide 210 of the axle gear link 200 may be constant. The end portion of the fixed frame 300 facing the steering operator 100 may have an arc shape corresponding to that of the link guide 210 of the axle gear link 200. In the gap between the axle gear link 200 and the fixed frame 300, there is provided the steering gear 130, which is engaged with both the axle gear link 200 and the fixed frame 300. Accordingly, the gear 220 and a frame gear 310 may be respectively engaged with the steering gear 130 to allow the axle gear link 200 and the steering operator 100 to integrally move in response to operation of the steering gear 130.

The carrier link 110 may be positioned between an arc-shaped portion of the link guide 210 and one end portion of the fixed frame 300, having a shape corresponding to the arc shape of the link guide 210. The carrier link 110 may surround at least portion of one end portion of the axle gear link 200 and at least portion of one end portion of the fixed frame 300 adjacent to the axle gear link 200. Moreover, when the steering gear 130 is rotated by the motor 120, the carrier link 110 may be moved integrally in response to the movement of the steering gear 130.

Each of the frame gear 310 of the fixed frame 300 and the gear 220 of the axle gear link 200, both of which are engaged with the steering gear 130, may be a toothed type with the same interval as each other, whereby the amount of rotation of the steering operator 100 and the amount of rotation of the axle gear link 200, both of which correspond to the rotation of the steering gear 130, may be the same as each other.

Therefore, when the steering operator 100 is positioned at one of opposite end portions of the frame gear 310 of the fixed frame 300, the steering gear 130 of the steering operator 100 may be positioned at a corresponding one of opposite end portions of the gear 220 of the axle gear link 200. When the steering operator 100 is moved to the above-described position, the wheel 500 is moved to have a maximum steering angle of 90 degrees either to the left or to the right.

Conversely, the frame gear 310 of the fixed frame 300 and the gear 220 of the axle gear link 200, which are respectively engaged with the steering gear 130, may be toothed gears having different intervals from each other. However, when the wheel 500 is positioned to have the maximum steering angle, the steering operator 100 may be positioned at one of opposite end portions of the frame gear 310 of the fixed frame 300, and the steering gear 130 of the steering operator 100 may be positioned at a corresponding one of opposite end portions of the gear 220 of the axle gear link 200.

Figure 4:
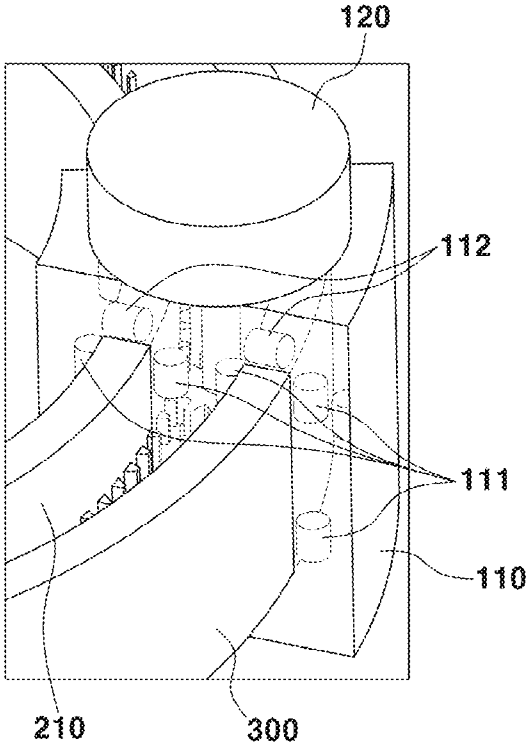
FIG. 4 illustrates an enlarged view of the steering operator of the independent corner module as an exemplary embodiment of the present disclosure.

FIG. 4 is various exemplary embodiments of the present disclosure, illustrating the configuration inside the carrier link 110 of the steering operator 100.

As illustrated, the carrier link 110 may surround at least portion of the link guide 210, which has an arc shape, and may surround at least portion of one end portion of the fixed frame 300, which is spaced from the link guide 210 and has a shape corresponding to that of the link guide 210.

Furthermore, the carrier link 110 may include an opening formed in one side, through which the axle gear link 200 passes, and an opening formed in another side, through which the fixed frame 300 passes. Accordingly, the distance between one end portion of the link guide 210 and one end portion of the fixed frame 300 facing the one end portion of the link guide 210 may be maintained constant due to the carrier link 110.

Furthermore, the steering gear 130, located inside the carrier link 110, may be rotated by the operating force of the motor 120 located at the upper end portion of the carrier link 110, and the steering gear 130 may move along the one end portion of the fixed frame 300. Furthermore, the axle gear link 200 is configured so that one end portion of the axle gear link 200 is rotated along the carrier link 110 when the rotation force of the steering gear 130 is applied.

The carrier link 110 may include a first roller 111 disposed inside the carrier link 110, and more specifically, disposed on side surfaces of the fixed frame 300, the carrier link 110, and the axle gear link 200 that face each other.

Moreover, the first roller 111 on the carrier link 110 may be provided on at least one of the side surface of the carrier link 110 and the side surface of the axle gear link 200 that face each other, and may be provided on at least one of the side surface of the fixed frame 300 and the side surface of the carrier link 110 that face each other.

That is, the first roller 111 may be located on the internal side surface of the carrier link 110 that surrounds the axle gear link 200 or on the internal side surface of the opening through which the axle gear link 200 passes. Furthermore, the first roller 111 may be located on the internal side surface of the carrier link 110 that surrounds the fixed frame 300 or on the internal side surface of the opening through which the fixed frame 300 passes.

Moreover, the carrier link 110 includes a second roller 112 disposed on at least one of the vertical upper end portion and the vertical lower end portion of the carrier link 110. At least one second roller 112 may be provided at vertical opposite end portions of the axle gear link 200 facing the carrier link 110, and at least one second roller 112 may be provided at vertical opposite end portions of the fixed frame 300 facing the carrier link 110.

Accordingly, when the carrier link 110 is moved by the operating force, the carrier link 110 may be moved in a state of low friction between the same and each of the axle gear link 200 and the fixed frame 300 due to the first roller 111 and the second roller 112.

Figure 5A:
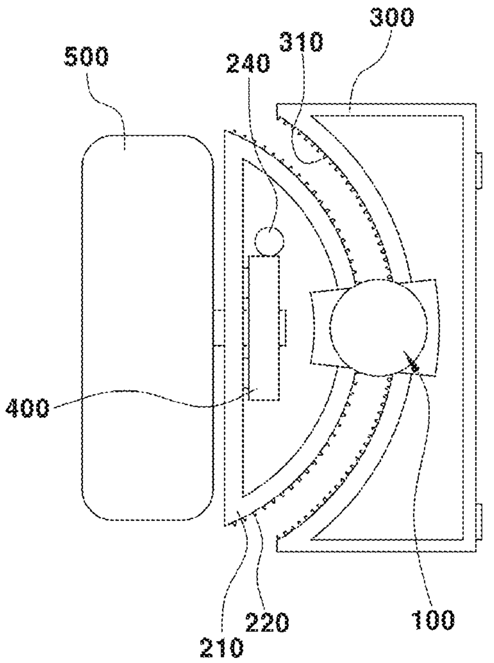
FIG. 5A illustrates a top view of the independent corner module of various exemplary embodiments of the present disclosure in a state in which the independent corner module is at a steering angle of 0 degrees.

FIG. 5A illustrates various exemplary embodiments of the present disclosure, and illustrates a coupling relationship in the state in which the steering angle of the independent corner module is at 0 degrees.

The independent corner module is configured to set the steering angle of the wheel 500 depending on a user's steering input or the driving environment. Furthermore, the independent corner module applies power to operate the motor 120 of the steering operator at the steering angle set in the above described manner.

As illustrated, when the steering angle is 0 degrees, the steering operator 100 of the independent corner module fixed to the vehicle body is positioned at the center portion of the frame gear 310 of the fixed frame 300, and the steering gear 130 is positioned at the center portion of the gear 220 of the axle gear link 200.

Figure 5B:
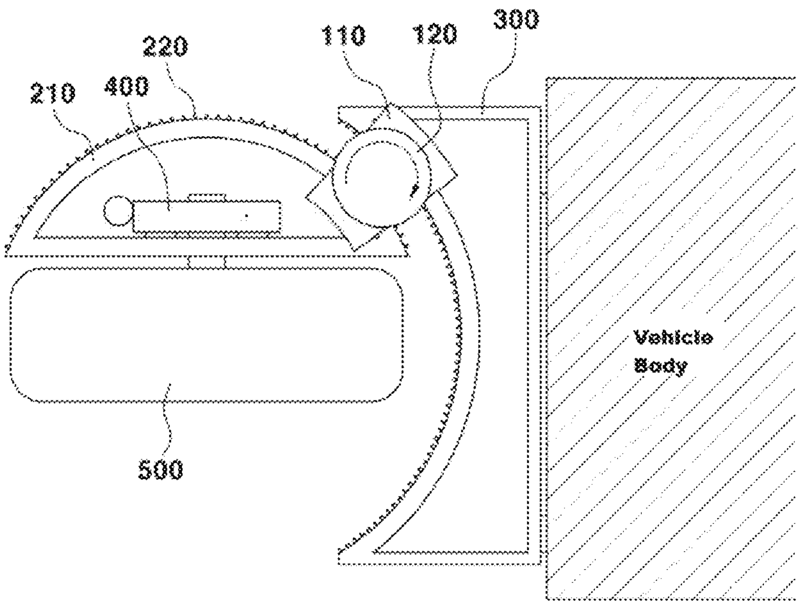
FIG. 5B illustrates a top view of the independent corner module of various exemplary embodiments of the present disclosure in a state in which the independent corner module is at a steering angle of 90 degrees to the left.

FIG. 5B illustrates the independent corner module in a state in which the steering angle is 90 degrees to the left.

In the state in which the steering angle is 90 degrees to the left, the steering gear 130 is positioned at the upper end portion of the frame gear 310 of the fixed frame 300 when viewed in a cross section, and the position of the lower end portion of the gear 220 of the axle gear link 200 engaged with the steering gear 130 is switched to a position facing the steering gear 130.

Accordingly, the wheel 500 may have a maximum leftward steering angle with respect to the longitudinal direction of the vehicle. Furthermore, in various exemplary embodiments of the present disclosure, the independent corner module may be controlled to have an angle of 90 degrees to the left.

Figure 5C:
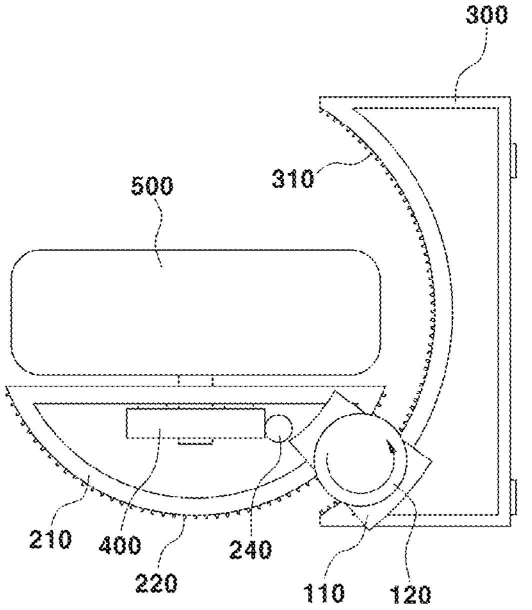
FIG. 5C illustrates a top view of the independent corner module of various exemplary embodiments of the present disclosure in a state in which the independent corner module is at a steering angle of 90 degrees to the right.

Conversely, FIG. 5C illustrates the independent corner module in a state in which the steering angle of the wheel 500 is 90 degrees to the right.

As illustrated, in the state in which the steering angle is 90 degrees to the right, the steering gear 130 is positioned at the lower end portion of the frame gear 310 of the fixed frame 300 when viewed in a cross section, and the position of the upper end portion of the gear 220 of the axle gear link 200, which is engaged with the steering gear 130, is switched to a position facing the steering gear 130 when viewed in a cross section.

Accordingly, the independent corner module in an exemplary embodiment of the present disclosure may have a maximum rightward steering angle, and as illustrated, the independent corner module is provided at an angle of 90 degrees to the right in various exemplary embodiments of the present disclosure.

Figure 6:
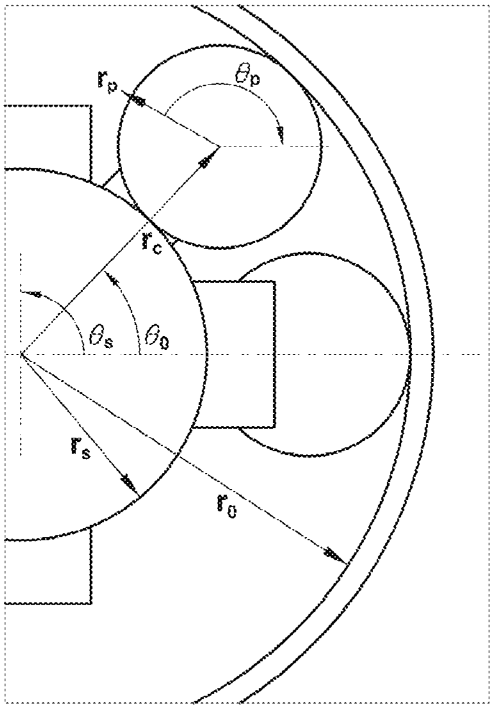
FIG. 6 illustrates a coupling relationship that determines a steering angle of the independent corner module of various exemplary embodiments of the present disclosure.

FIG. 6 is various exemplary embodiments of the present disclosure, illustrating the amount of rotation of each of components to which the steering angle of the vehicle applied.

In the case of the independent corner module of the present disclosure, the end portion of the axle gear link 200 surrounded by the carrier link 110 of the steering operator 100 has an arc shape, and the center shaft of the arc-shaped axle gear link 200 is the center portion of the wheel 500 in a cross section.

Furthermore, one end portion of the fixed frame 300 also has a shape corresponding to the arc shape of the axle gear link 200, and the center shaft of the fixed frame 300 is formed at the center portion of the wheel 500 when viewed in a cross section.

Accordingly, the steering angle θs applied to the wheel 500 is determined by the following equation.

$$\theta p/\theta o=(Rs+Ro)Rp$$

$$\theta s\times Rs=\theta p\times Rp=\theta o\times(Rs+Ro) \quad \text{[Equation 1]}$$

(θp=rotation angle of steering operator 100, θo=rotation angle of steering operator 100 from center portion of wheel 500, Rs=distance from center portion of wheel 500 to end portion of axle gear link 200 in contact with steering operator 100, Ro=distance from center portion of wheel 500 to end portion of fixed frame 300 in contact with steering operator 100, and Rp=rotation radius of steering operator 100)

According to Equation 1, the steering angle may be determined by multiplying the sum of the distance from the center portion of the wheel 500 to the end portion of the axle gear link 200 which is in contact with the steering operator 100 and the distance from the center portion of the wheel 500 to the end portion of the fixed frame 300 which is in contact with the steering operator 100 by the rotation angle of the steering operator 100 from the center portion of the wheel 500, and dividing the result by the distance from the center portion of the wheel 500 to the end portion of the axle gear link 200 which is in contact with the steering operator 100.

That is, the arc-shaped end portion of the axle gear link 200 and the arc-shaped end portion of the fixed frame 300 provided at a position corresponding to the axle gear link 200 may rotate about the center portion of the wheel 500, which is the center shaft of the axle gear link 200 and the fixed frame 300. Accordingly, the steering angle may be determined by the relationship between the arc-shaped end portion of the axle gear link 200, the radius of the arc-shaped portion of the fixed frame 300, which is provided at a position corresponding to the axle gear link 200, and the rotation radius of the steering operator 100.

As is apparent from the above description, the present disclosure can obtain the following effects by the configuration, combination, and operation relationship described above with the exemplary embodiment of the present disclosure.

The present disclosure has an effect of imparting a wider steering angle to the wheel by independently rotating the steering operator and the axle gear link.

Furthermore, the present disclosure has an effect of providing structural stability configured for absorbing vertical motion applied to the wheel by including the vertical guide between the axle gear link and the knuckle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An independent corner module comprising:

a knuckle fastened to a wheel;

an axle gear link engaged to the knuckle and configured to guide a vertical motion of the knuckle;

a fixed frame adjacent to the axle gear link and fixed to a vehicle body;

a steering operator positioned between the axle gear link and the fixed frame and coupling the axle gear link to the fixed frame to apply an operating force;

wherein the steering operator moves along the fixed frame by the operating force of the steering operator, and at a same time, the axle gear link rotates, and wherein the fixed frame includes a frame gear provided at an end portion of the fixed frame that faces the steering operator.

2. The independent corner module of claim 1, wherein the steering operator includes:

a carrier link surrounding at least a portion of the axle gear link and at least a portion of the fixed frame to move along the fixed frame;

an actuator configured to apply a rotation force; and a steering gear extending from a rotation shaft of the actuator and gear-engaged with the fixed frame and the axle gear link.

3. The independent corner module of claim 2, wherein the actuator is a motor.

4. The independent corner module of claim 2, wherein the carrier link includes at least one first roller disposed on an internal side surface of the carrier link adjacent to the fixed frame or on an internal side surface of the carrier link adjacent to the axle gear link.

5. The independent corner module of claim 2, wherein the carrier link includes at least one second roller disposed at a vertical end portion of the fixed frame adjacent to the carrier link or at a vertical end portion of the axle gear link adjacent to the carrier link.

6. The independent corner module of claim 1, wherein the axle gear link includes:

a link guide configured to guide the steering operator; and a gear formed on the link guide and engaged with the steering operator to enable the link guide to rotate when the steering operator rotates.

7. The independent corner module of claim 6, wherein the axle gear link further includes a vertical guide configured to allow one end portion of the knuckle to move vertically.

8. The independent corner module of claim 1, wherein the steering operator is configured to reach either one of opposite end portions of the fixed frame upon application of the operating force.

9. The independent corner module of claim 8, wherein, when the steering operator is positioned at one of the opposite end portions of the fixed frame, the steering operator is positioned at a corresponding one of opposite end portions of the axle gear link.

10. The independent corner module of claim 1, further including:

a buffer, wherein a first end portion of the buffer is coupled to the knuckle and a second end portion of the buffer is coupled to the axle gear link to support the vertical motion of the knuckle.

11. The independent corner module of claim 1, wherein a surface of the axle gear link and a surface of the fixed frame that are adjacent to and face each other have arc shapes sharing a same center.

* * * * *